Jan. 9, 1973 C. G. GILMORE 3,709,758
STRAP SEALING TOOL
Filed Jan. 20, 1971
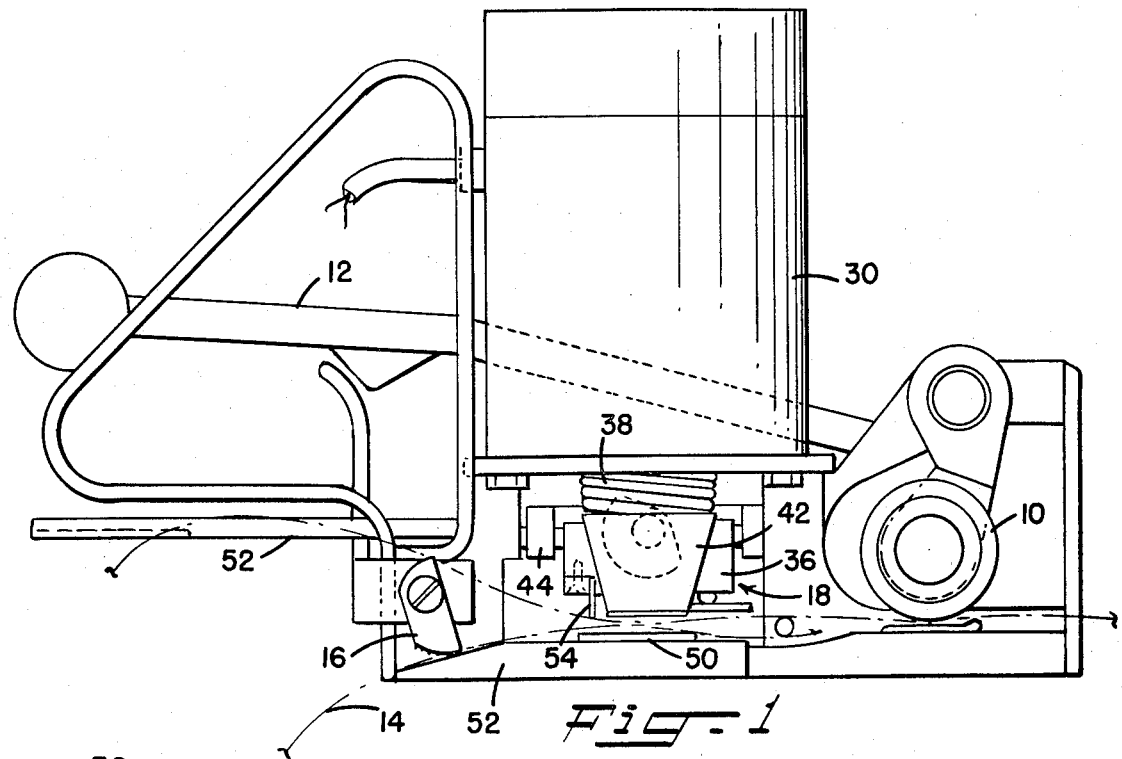
Fig. 1
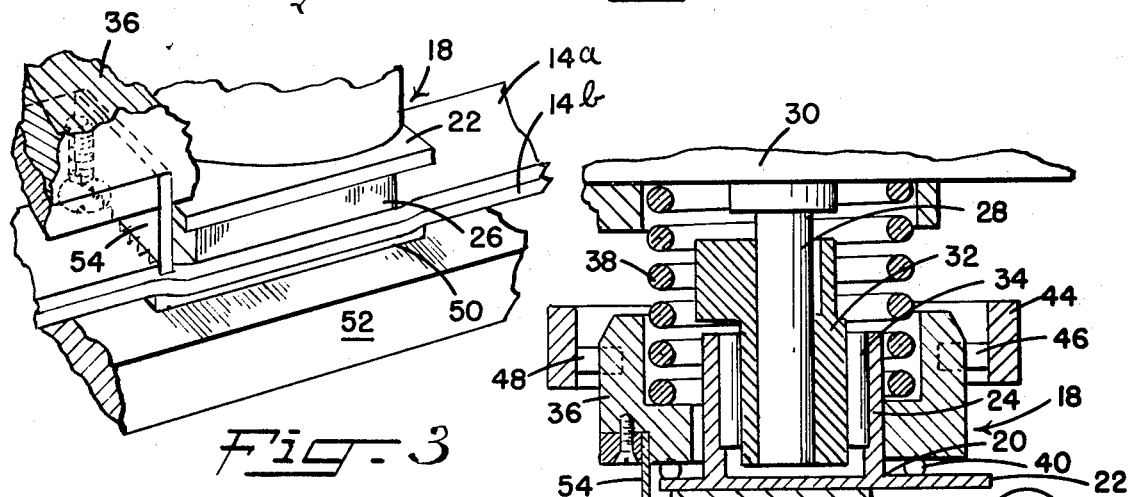
Fig. 3
Fig. 2
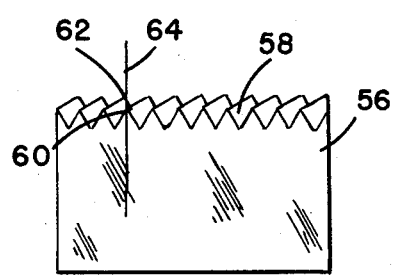
Fig. 4

United States Patent Office 3,709,758
Patented Jan. 9, 1973

3,709,758
STRAP SEALING TOOL
Charles G. Gilmore, Wilmington, Del., assignor to FMC Corporation, Philadelphia, Pa.
Filed Jan. 20, 1971, Ser. No. 108,009
Int. Cl. B32b 31/20
U.S. Cl. 156—494                    4 Claims

ABSTRACT OF THE DISCLOSURE

A tool for friction welding a tensioned loop of plastic strapping is provided with a stationary saw-toothed cutter closely adjacent the welding mechanism. As the strap is moved by the welding mechanism it is rubbed against the saw tooth blade so as to cut the tensioned loop from a supply without leaving an outwardly directed tab adjacent the welded joint.

This invention relates to a tool for joining together overlapping portions of a loop of plastic strapping tensioned about an article and for severing the strapping from a supply at the joint. More particularly, it deals with apparatus for effecting a heat-seal joint, especially a friction welded heat-seal joint of overlapping portions of a tensioned loop of plastic strapping and for severing the tensioned loop from a supply of strapping at the seal without leaving a tab or free end of strap extending beyond the seal on the outside of the loop.

Heat-seal joints for plastic strapping, whether the heat for effecting the seal is provided by inserting a hot blade between overlapping strap portions as shown for example in the U.S. Pat. No. 3,638,323 to Wood or by friction from rubbing overlapping strap portions together under pressure as shown for example in the U.S. Pat. No. 3,554,845 to Billet et al., can have a very high tensile strength but such joints have a low peel or strip-back strength. Because of this low peel strength, it is often, if not always, desirable to leave as little tab or strap end extending beyond the seal as possible when severing the sealed loop from the strapping supply. If there is a tab it is apt to be caught or hit during handling of the package and accidentally peel open the seal.

It is the primary object of this invention to provide an improved tool or apparatus for friction welding overlapping portions of a tensioned loop of plastic strapping and severing the loop from a supply of strapping in such a manner as to leave no tab or free end of strap at the outside of the weld.

Other and further objects, features and advantages of the invention will become apparent as the description of preferred embodiments thereof proceeds.

Referring now to the drawing:

FIG. 1 is a side elevational view of a strapping tool embodying the invention;

FIG. 2 is an enlarged sectional view of the friction welding and strap severing mechanisms;

FIG. 3 is a close-up perspective demonstrating the operation of the strap severing mechanism; and FIG. 4 is a side elevation of a modified form of severing means.

The details of construction and exact manner of operation of the tool shown in FIG. 1 are described in the above-referred to Billett et al. Pat. No. 3,554,845, the disclosure of which is hereby incorporated herein by reference. In general, the tool comprises a tensioning mechanism in the form of a feed wheel 10 operated by oscillation of a lever 12 to tension a loop of plastic strapping 14 about an article such as a package or group of packages, not shown. During tensioning, one end of the strapping is held stationary by a pivoted dog 16 and overlapping strap portions 14a and 14b (see FIGS. 2 and 3) are provided beneath and in the vicinity of a sealing head generally indicated at 18 forming part of a friction fusion or welding means. Beyond sealing head 18 the upper strap portion 14a extends to a supply such as a roll, not shown, prior to the cutting or severing of the tensioned loop from the supply during sealing together of a length of the overlapping portions 14a and 14b. The particular forms of tensioning mechanism and strap gripping means shown are not of the essence of the present invention and these mechanisms could just as well be as shown in Pat. No. 3,545,723 to Raley et al., or for that matter could be in any conventional form.

The sealing head 18 comprises a device 20 having a flat bottom portion 22 and a cylindrical portion 24 extending upwardly from the central area of the bottom portion. Secured to the underside of the portion 22 is a strap engaging means 26 which may be metal with a spiked, serrated or otherwise roughened strap gripping face or which may be a somewhat resilient pad for frictionally engaging the strap. Extending into the cylindrical portion 24 is the lower end of a drive shaft 28 of a suitable motor 30 and secured to the drive shaft is a sleeve 32 which has a cylindrical outer surface eccentric of the longitudinal center line of the drive shaft. A suitable anti-friction bearing such as a needle bearing 34 is provided between sleeve 32 and the cylindrical portion 24 of device 20. Loosely surrounding cylindrical portion 24 of the device 20 is a collar 36 and a heavy compression spring 38 is compressed between a seat in the collar and the bottom of motor 30. Located in sockets provided in the bottom of collar 36 are balls 40 which rest on the upper face of the flat bottom portion 22 of device 20. As described in the Billett et al. Pat. No. 3,554,845 a retainer 42 (see FIG. 1) secured to collar 36 has a flange underlying an edge of device 20 to prevent it from sliding out of the collar. A shifter yoke 44 is articulated to collar 36 by a pair of pins 46 and 48 and said yoke is normally held in a position to hold collar 36 and the parts associated therewith in the position shown in FIG. 2 so that there is sufficient space between pad 26 and an underlying pad 50 to loosely accommodate the overlapping strap portions 14a and 14b. Operation of a lever 52 (see FIG. 1) is effective to either hold yoke 44 up or to lower it and thereby release collar 36 to the action of spring 38 whereby the overlapping strap portions are tightly squeezed between pads 26 and 50.

Pad 50 is formed of a somewhat resilient or compressible material such as a polyurethane elastomer and is stationarily mounted in a foot 52 of the tool. If desired, pad 50 may be yieldably mounted as shown in the Billett et al. Pat. No. 3,554,845. Pad 50 is larger or longer in the direction longitudinal of the strapping than pad 26 and provides a segment directly underlying pad 26 and another segment extending beyond pad 26 and underlying a cutting means in the form of a saw-toothed blade 54. Blade 54 is rigidly secured in the lower face of collar 36 and extends across the width of the strapping closely adjacent pad 26 on that side or end of said pad toward the supply of strapping. As best seen in FIG. 2, the points of the teeth of blade 54 are about on a plane with the face of pad 26.

In using the tool, after the loop of strapping has been tensioned about the article, lever 52 is operated to lower yoke 44 to thereby permit spring 38 to press collar 36 down. Downward movement of collar 36 is transmitted through balls 40 to the device 20 which in turn causes pad 26 to engage strap portion 14a and squeeze strap portions 14a and 14b together between pads 26 and 50. As explained in the previously mentioned Billett et al. patent, this operation of lever 52 is also effective to start motor 30, whereupon eccentric sleeve 32 secured to the motor drive shaft 18 imparts an orbital motion to device 20 with the axis of drive shaft 28 at the center of motion. Pad 26, of course, moves in a similar fashion and since it is firmly an non-slippably engaged with the upper strap portion 14a it causes the strap portion to move in such manner that a point on the longitudinal center line of this strap portion orbits about a point on the longitudinal center line of strap portion 14b. Of course, all other incrementally spaced points on strap portion 14a also orbit about corresponding incrementally spaced points on strap portion 14b. This orbital motion of strap portion 14a need be continued for only a brief time to cause a melting of the facing areas of strap portions 14a and 14b and after the motion is stopped the strap portions are held pressed together for a further brief period to cause the melted areas to fuse or weld together.

As previously mentioned, pad 50 is made of a resilient, compressible material, is longer than pad 26 and has a segment underlying blade 54. As illustrated in FIG. 3, pad 50 is actually compressed, or at least compressed to any great extent only directly beneath pad 26. While pad 26 and the upper strap portion 14a make an orbital movement during the friction welding operation, such movement need be, and is, only of small amplitude and at no time does pad 26 apply pressure to that segment of pad 50 which underlies the blade 54. Therefore, while pad 26 is applying pressure and imparting the small orbital movement to strap portion 14a, that segment of pad 50 beneath blade 54 is effective to deflect both strap portions 14a and 14b upwardly toward the blade as shown in FIG. 3 and hold portion 14a firmly in contact with the teeth of the blade.

Orbital movement of strap portion 14a has a component extending lengthwise of blade 54 as well as a component extending perpendicular to the blade and longitudinally of the strap. That component lengthwise of the blade causes the blade to saw through strap portion 14a during the friction welding orbital movement of said strap portion, the sawing action being made effective by the strap portion being held against the blade by the substantially noncompressed portion of pad 50. Even if blade 54 is slightly misadjusted there is no danger of sawing through strap portion 14b since there is no relative movement between the blade and strap portion 14b.

While the pressure between strap portions 14a and 14b is not as great beneath blade 54 as beneath pad 26, there is sufficient pressure of the strap faces against one another between the blade and the edge of pad 26 and sufficient relative movement in this area as to cause the strap portions to fuse together right up to the blade. This is not as strong a fusion or weld as in the area beneath pad 26 but is sufficient to avoid a free tab adjacent the welded joint.

While the invention has been described in connection with a tool wherein the frictional heat of fusion is brought about by an orbital movement of one of the strap portions it can also be employed where the frictional heat is produced by a reciprocating movement of the strap portion 14a. In the case of reciprocating motion it is logical to move strap portion 14a back and forth longitudinally of the strap rather than transversely since this latter type of movement would move the overlapping portions out of alignment with one another and could result in a fused joint which did not extend entirely across the width of the strap. Longitudinal reciprocation of strap portion 14a, of course, means that the strap is moved perpendicularly of the blade and in this case the blade is modified as shown in FIG. 4 wherein the blade is designated 56. Blade 56 is provided with teeth 58 extending at an angle such that a front corner 60 of one tooth overlaps the rear corner 62 of an adjacent tooth in a plane perpendicular to the blade. One such plane is indicated in FIG. 4 at 64. When the strap portion to be cut is reciprocated against and at right angles to blade 56 the overlapping teeth 58 are effective to sever the strap and here again the strap portions 14a and 14b become welded right up to the blade so that no free tab is left in portion 14a.

Certain preferred embodiments of the invention having been described, what is claimed is:

1. Strapping apparatus comprising means for tensioning a loop of plastic strapping about an article so as to provide overlapping strap portions and a length of strapping extending from the overlapping area to a supply, a substantially stationary support for engaging a first one of the overlapping strap portions, pressing means for pressing the second overlapping strap portion against the first portion under substantial pressure, said pressing means comprising a first element movable only perpendicular to the overlapping strap portions and a second element for grippingly engaging the second overlapping strap portion, means for moving said second element in such manner as to cause it to rub the second overlapping strap portion against the first portion to melt the facing areas of the two strap portions and form a fused joint, cutter means fixedly secured to said first element, said cutter means being in the form of a saw-toothed blade extending across the second overlapping strap portion near where said portion is engaged by said second element, the aforesaid movement of said second element causing said second overlapping strap portion to rub against said blade so as to sever said second strap portion adjacent the fused joint without leaving a tab.

2. The apparatus set forth in claim 1, wherein said second element imparts an orbital movement to said second strap portion whereby said second strap portion has a component of movement longitudinally along said blade.

3. The apparatus set forth in claim 1 comprising means pressing said second strap portion against the teeth of said blade whereby the blade saws through said second strap portion.

4. The apparatus set forth in claim 1 wherein said substantially stationary support comprises a compressible pad having a segment underlying the second element of said pressing means so as to be compressed when the second strap portion is pressed against the first strap portion and having a segment underlying said blade and serving to resiliently press the second strap portion against the blade during operation of the second element of the pressing means.

References Cited

UNITED STATES PATENTS

| | | | |
|---|---|---|---|
| 3,442,732 | 5/1969 | Stensaker et al. | 156—73 |
| 3,442,735 | 5/1969 | Stensaker | 156—73 |
| 3,442,733 | 5/1969 | Vilcins | 156—73 |
| 3,554,845 | 1/1971 | Billett et al. | 156—580 |

DANIEL J. FRITSCH, Primary Examiner

U.S. Cl. X.R.

53—198; 100—29; 156—502, 530, 580

UNITED STATES PATENT OFFICE
CERTIFICATE OF CORRECTION

Patent No. 3,709,758  Dated January 9, 1973

Inventor(s) Charles G. Gilmore

It is certified that error appears in the above-identified patent and that said Letters Patent are hereby corrected as shown below:

Col. 1, line 34, "3,638,323" should read -- 3,368,323 --;
line 37, "Billet" should read -- Billett --

Signed and sealed this 22nd day of May 1973.

(SEAL)
Attest:

EDWARD M. FLETCHER, JR.
Attesting Officer

ROBERT GOTTSCHALK
Commissioner of Patents